United States Patent
Tomida

(10) Patent No.: US 12,151,513 B2
(45) Date of Patent: Nov. 26, 2024

(54) PNEUMATIC TIRE

(71) Applicant: BRIDGESTONE CORPORATION, Tokyo (JP)

(72) Inventor: Tatsuya Tomida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 374 days.

(21) Appl. No.: 17/612,523

(22) PCT Filed: May 27, 2020

(86) PCT No.: PCT/JP2020/021000
§ 371 (c)(1),
(2) Date: Nov. 18, 2021

(87) PCT Pub. No.: WO2020/250688
PCT Pub. Date: Dec. 17, 2020

(65) Prior Publication Data
US 2022/0227176 A1     Jul. 21, 2022

(30) Foreign Application Priority Data
Jun. 14, 2019   (JP) ................................ 2019-110817

(51) Int. Cl.
| B60C 11/03 | (2006.01) |
| B60C 11/00 | (2006.01) |
| B60C 11/12 | (2006.01) |

(52) U.S. Cl.
CPC ...... B60C 11/0306 (2013.01); B60C 11/0008 (2013.01); B60C 11/1272 (2013.01);
(Continued)

(58) Field of Classification Search
CPC . B60C 11/0008; B60C 11/03; B60C 11/0306; B60C 11/12; B60C 11/1204;
(Continued)

(56) References Cited

U.S. PATENT DOCUMENTS

| 9,764,598 B2 | 9/2017 | Radulescu et al. |
| 10,500,904 B2 | 12/2019 | Yamamoto |

(Continued)

FOREIGN PATENT DOCUMENTS

| CN | 204020427 U | 12/2014 |
| CN | 107614291 A | 1/2018 |

(Continued)

OTHER PUBLICATIONS

Yoshizawa K, JP-2013184331-A, machine translation. (Year: 2013).*

(Continued)

*Primary Examiner* — Sedef E Paquette
(74) *Attorney, Agent, or Firm* — Oliff PLC

(57) ABSTRACT

A pneumatic tire includes, on a tread surface, a plurality of circumferential main grooves extending in the tread circumferential direction, and a plurality of land portions defined by circumferential main grooves adjacent in the tread width direction among the plurality of circumferential main grooves, or by the circumferential main grooves and tread edges. A widthwise groove (widthwise sipe) (circumferential sipe) includes a widened portion, on the groove bottom side (sipe bottom side), at which the groove width (sipe width) is larger than on the tread surface side. In a tire radial direction region including at least a reference depth position, the storage modulus of first tread rubber, which is a groove wall surface layer defined by the widened portion and covering at least part of the widened portion, is larger than the storage modulus of second tread rubber located in a region around the first tread rubber.

20 Claims, 3 Drawing Sheets

(52) U.S. Cl.
CPC ............... *B60C 2011/0025* (2013.01); *B60C 2011/0353* (2013.01); *B60C 2011/0355* (2013.01)

(58) Field of Classification Search
CPC ............ B60C 11/1218; B60C 11/1272; B60C 11/1281; B60C 11/13; B60C 11/1307; B60C 11/1346; B60C 2011/0025; B60C 2011/0339; B60C 2011/0341; B60C 2011/0348; B60C 2011/0353; B60C 2011/0355; B60C 2011/036; B60C 2011/0365; B60C 2011/1209
USPC ............... 152/209.1, 209.18, 209.25, 209.27
See application file for complete search history.

(56) References Cited

U.S. PATENT DOCUMENTS

| | | | |
|---|---|---|---|
| 10,773,554 | B2 | 9/2020 | Hatanaka |
| 2009/0159167 | A1* | 6/2009 | Scheuren ............ B60C 11/1281 425/470 |
| 2013/0213542 | A1 | 8/2013 | Warfford et al. |
| 2015/0059943 | A1 | 3/2015 | Radulescu et al. |
| 2017/0355231 | A1 | 12/2017 | Marlier et al. |
| 2018/0281530 | A1* | 10/2018 | Lawson ............. B60C 11/1281 |

FOREIGN PATENT DOCUMENTS

| | | |
|---|---|---|
| CN | 108790612 A | 11/2018 |
| DE | 10 2017 222 513 A1 | 6/2019 |
| EP | 2 946 945 A1 | 11/2015 |
| EP | 3 434 497 A1 | 1/2019 |
| JP | S61-132105 U | 8/1986 |
| JP | 2002-114010 A | 4/2002 |
| JP | 2010047072 A * | 3/2010 ......... B60C 11/1346 |
| JP | 2013-133084 A | 7/2013 |
| JP | 2013184331 A * | 9/2013 |
| JP | 2013-540077 A | 10/2013 |
| JP | 2014-097697 A | 5/2014 |
| JP | 2015-512352 A | 4/2015 |
| JP | 2017-193222 A | 10/2017 |
| JP | 2018-504307 A | 2/2018 |
| JP | 2019-064481 A | 4/2019 |
| WO | 2013/150143 A1 | 10/2013 |

OTHER PUBLICATIONS

Himuro Y, JP-2002114010-A, updated machine translation. (Year: 2002).*
Iizuka H, JP-2010047072-A, machine translation. (Year: 2010).*
Dec. 1, 2022 Office Action Search Report issued in Chinese Patent Application No. 202080040123.1.
Aug. 4, 2020 International Search Report issued in International Patent Application No. PCT/JP2020/021000.
Dec. 14, 2021 International Preliminary Report on Patentability issued in International Patent Application No. PCT/JP2020/021000.
May 26, 2023 Extended European Search Report Issued in European Patent Application No. 20822945.0.

* cited by examiner

PNEUMATIC TIRE

TECHNICAL FIELD

The present disclosure relates to a pneumatic tire.

BACKGROUND

As technology for improving the drainage performance of a tire when wear progresses, it has been proposed to provide grooves, in the tread surface of a tire, whose groove width increases when wear progresses. For example, see Patent Literature (PTL) 1.

CITATION LIST

Patent Literature

PTL 1: JP 2013-540077 A

SUMMARY

Technical Problem

With the technology disclosed in PTL 1, however, as a portion with increased groove width is about to appear when wear progresses, the rigidity of the portion decreases, and local wear occurs. This may lead to uneven wear in the tire.

The present disclosure aims to provide a pneumatic tire capable of improving the drainage performance while suppressing the occurrence of uneven wear when wear progresses.

Solution to Problem

A summary of the present disclosure is as follows.

(1) A pneumatic tire includes, on a tread surface, a plurality of circumferential main grooves extending in a tread circumferential direction, and a plurality of land portions, each land portion being defined between circumferential main grooves adjacent in a tread width direction among the plurality of circumferential main grooves, or by the circumferential main groove and a tread edge, wherein the land portion includes a plurality of widthwise grooves extending in the tread width direction, the widthwise groove includes a widened portion, on a groove bottom side, at which a groove width is larger than on the tread surface side, when the pneumatic tire is mounted on an applicable rim, filled to a prescribed internal pressure, and under no load, a groove depth position, farthest outward in a tire radial direction, at which the groove width of the widened portion of the widthwise groove is 2.5 or more times an opening width of the widthwise groove at the tread surface, is designated as a reference depth position, and in a tire radial direction region including at least the reference depth position, a storage modulus of first tread rubber is larger than a storage modulus of second tread rubber located in a region around the first tread rubber, the first tread rubber being a groove wall surface layer defined by the widened portion and covering at least part of the widened portion.

(2) A pneumatic tire includes, on a tread surface, a plurality of circumferential main grooves extending in a tread circumferential direction, and a plurality of land portions, each land portion being defined between circumferential main grooves adjacent in a tread width direction among the plurality of circumferential main grooves, or by the circumferential main groove and a tread edge, wherein the land portion includes a plurality of widthwise sipes extending in the tread width direction, the widthwise sipe includes a widened portion, on a sipe bottom side, at which a sipe width is larger than on the tread surface side, when the pneumatic tire is mounted on an applicable rim, filled to a prescribed internal pressure, and under no load, a sipe depth, farthest outward in a tire radial direction, at which the sipe width of the widened portion of the widthwise sipe is 2.5 or more times an opening width of the widthwise sipe at the tread surface, is designated as a reference depth position, and in a tire radial direction region including at least the reference depth position, a storage modulus of first tread rubber is larger than a storage modulus of second tread rubber located in a region around the first tread rubber, the first tread rubber being a groove wall surface layer defined by the widened portion and covering at least part of the widened portion.

(3) A pneumatic tire includes, on a tread surface, a plurality of circumferential main grooves extending in a tread circumferential direction, and a plurality of land portions, each land portion being defined between circumferential main grooves adjacent in a tread width direction among the plurality of circumferential main grooves, or by the circumferential main groove and a tread edge, wherein the land portion includes at least one circumferential sipe extending in the tread circumferential direction, the circumferential sipe includes a widened portion, on a sipe bottom side, at which a sipe width is larger than on the tread surface side, when the pneumatic tire is mounted on an applicable rim, filled to a prescribed internal pressure, and under no load, a sipe depth, farthest outward in a tire radial direction, at which the sipe width of the widened portion of the circumferential sipe is 2.5 or more times an opening width of the circumferential sipe at the tread surface, is designated as a reference depth position, and in a tire radial direction region including at least the reference depth position, a storage modulus of first tread rubber is larger than a storage modulus of second tread rubber located in a region around the first tread rubber, the first tread rubber being a groove wall surface layer defined by the widened portion and covering at least part of the widened portion.

Here, the "tread surface" refers to the entire tread surface in the tread circumferential direction that comes into contact with the road surface when the pneumatic tire is mounted on an applicable rim, filled to a prescribed internal pressure, and subjected to the maximum load.

The "circumferential main groove" refers to a groove extending in the tread circumferential direction and having an opening width of 1.5 mm or more at the aforementioned tread surface when the pneumatic tire is mounted on an applicable rim, filled to a prescribed internal pressure, and under no load.

The "tread edges" refer to the outermost points of the aforementioned tread surface on both sides in the tire width direction.

The "widthwise groove" refers to a groove extending in the tread width direction and having an opening width of 1.0 mm or more at the aforementioned tread surface when the pneumatic tire is mounted on an applicable rim, filled to a prescribed internal pressure, and under no load.

The "widthwise sipe" refers to a sipe extending in the tread width direction and having an opening width of less than 1.0 mm at the aforementioned tread surface when the pneumatic tire is mounted on an applicable rim, filled to a prescribed internal pressure, and under no load.

The "circumferential sipe" refers to a sipe extending in the tread circumferential direction and having an opening width of less than 1.5 mm at the aforementioned tread surface when the pneumatic tire is mounted on an applicable rim, filled to a prescribed internal pressure, and under no load.

The "storage modulus" refers to the storage modulus measured at a temperature of 25° C. in accordance with JIS K7244.

In the present specification, the "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA. (In other words, the "rim" encompasses not only current sizes but also sizes that may be included in industrial standards in the future. An example of the "size that will be described in the future" is the size described under "future developments" in the ETRTO Standards Manual 2013). In the case of a size not specified in the aforementioned industrial standards, the "rim" refers to a rim whose width corresponds to the bead width of the tire.

The "prescribed internal pressure" represents the air pressure (maximum air pressure) corresponding to the maximum load capability of a single wheel in an applicable size/ply rating described by the aforementioned JATMA or the like. In the case of a size not listed in the industrial standards, the "prescribed internal pressure" refers to the air pressure (maximum air pressure) corresponding to the maximum load capability prescribed for each vehicle on which the tire is mounted.

The "maximum load" refers to the load corresponding to the aforementioned maximum load capability.

In the present specification, when the "tire radial position of maximum width" has a width in the tire radial direction, the position referred to is the outermost position in the tire radial direction of the region.

In the present specification, the "thickness t" refers to the maximum thickness if the thickness is not constant.

Advantageous Effect

According to the present disclosure, a pneumatic tire capable of improving the drainage performance while suppressing the occurrence of uneven wear when wear progresses can be provided.

DETAILED DESCRIPTION

Embodiments of the present disclosure are described below in detail with reference to the drawings.

The internal structure and the like of the pneumatic tire (hereinafter referred to simply as the tire) can be the same as those of conventional tires. As an example, the tire can have a pair of bead portions, a pair of sidewall portions connected to the pair of bead portions, and a tread portion disposed between the pair of sidewall portions. The tire can also have a carcass extending toroidally between the pair of bead portions and a belt disposed on the radially outward side of a crown portion of the carcass.

Unless otherwise specified, the dimensions and the like refer to the dimensions and the like when the tire is mounted on an applicable rim, filled to a prescribed internal pressure, and under no load.

Figure 1:
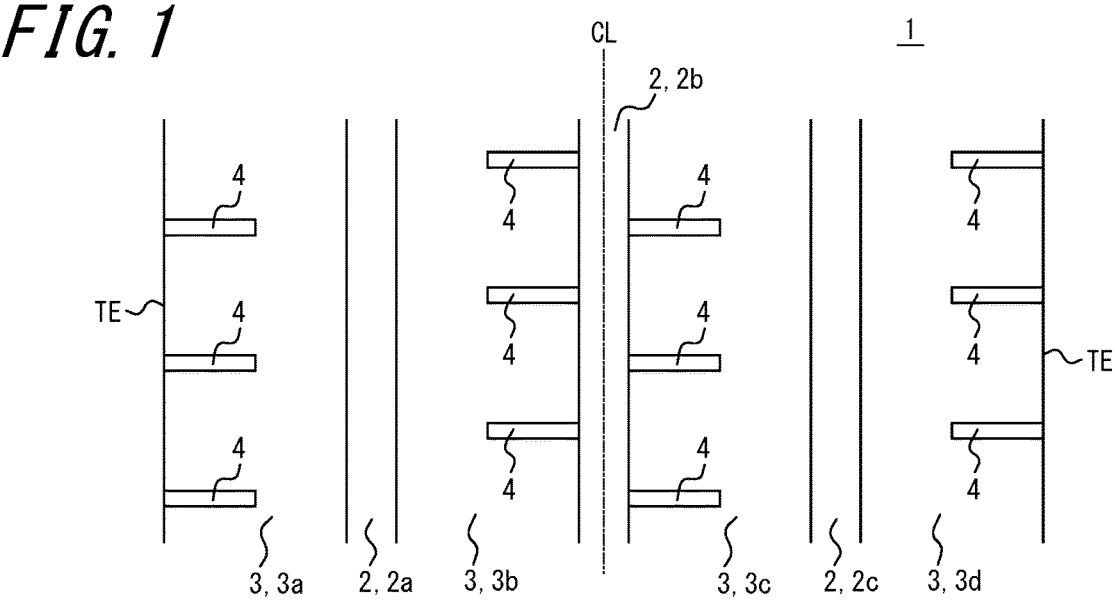
FIG. 1 is a developed view schematically illustrating a tread pattern of a pneumatic tire according to an embodiment of the present disclosure.

FIG. 1 is a developed view schematically illustrating a tread pattern of a pneumatic tire according to an embodiment of the present disclosure.

As illustrated in FIG. 1, the tire in the present example includes, on a tread surface 1, a plurality (three in the illustrated example) of circumferential main grooves 2 (2a, 2b, 2c) extending in the tread circumferential direction, and a plurality (four in the illustrated example) of land portions 3 (3a, 3b, 3c, 3d) defined by circumferential main grooves 2 adjacent in the tread width direction among the plurality of circumferential main grooves 2, or by a circumferential main groove (2a, 2c) and a tread edge TE. In the present example, one circumferential main groove 2b is positioned on the tire equatorial plane CL, and the other circumferential main grooves 2a and 2c are respectively positioned in one half and the other half, in the tread width direction, divided by the tire equatorial plane CL. In the present example, two land portions 3 are arranged in each tread widthwise half. As illustrated, the land portions 3b, 3c are land portions by the center in the tread width direction, and the land portions 3a, 3d are land portions adjacent to the tread edges TE.

In the example illustrated in FIG. 1, the number of circumferential main grooves 2 is three, but the number can be two or can be four or more. Accordingly, the number of land portions 3 can also be three, or can be five or more. In the present example, all of the land portions are rib-like land portions 3, but at least one of the land portions may be a land portion that is not rib-like, i.e., a block-shaped land portion. A "rib-like land portion" refers to a land portion that is not completely divided in the tread circumferential direction by a widthwise groove extending in the tread width direction. Accordingly, in the present specification, a land portion is a "rib-like land portion" even if it is completely divided in the tread circumferential direction by a widthwise sipe.

The groove width (opening width (opening width measured perpendicular to the extending direction of the groove in plan view)) of the circumferential main groove 2 is not particularly limited, since the groove width depends on the number of circumferential main grooves 2, but can, for example, be between 5 mm and 25 mm. Similarly, the groove depth (maximum depth) of the circumferential main groove 2 is not particularly limited, but can, for example, be between 6 mm and 18 mm.

In the illustrated example, the circumferential main grooves 2 all extend along the tread circumferential direction (without inclination) in plan view of the tread surface 1, but at least one of the circumferential main grooves 2 may extend at an inclination relative to the tread circumferential direction. In this case, the circumferential main groove 2 may be inclined at an angle of, for example, 5° or less relative to the tread circumferential direction. In the illustrated example, all of the circumferential main grooves 2 extend straight in the tread circumferential direction, but at least one of the circumferential main grooves 2 may have a shape such as a zigzag shape or a curved shape.

In the illustrated example, each land portion 3 includes a plurality of widthwise grooves 4 extending in the tread width direction. Specifically, in the present example, the (rib-like in the illustrated example) land portions 3a, 3d adjacent to the tread edges TE include widthwise grooves 4, three each in the illustrated range, that extend from the tread edge TE inward in the tread width direction and terminate in the (rib-like in the illustrated example) land portions 3a, 3d. The (rib-like in the illustrated example) land portions 3b, 3c by the center in the tread width direction include widthwise grooves 4, three each in the illustrated range, that extend outward in the tread width direction from the circumferential main groove 2b positioned on the tire equatorial plane CL and terminate in the (rib-like in the illustrated example) land portions 3b, 3c. The number of the widthwise grooves 4 can be appropriately set. In the illustrated example, all of the land portions 3 include the widthwise grooves 4. When the widthwise grooves 4 are included on the tread surface 1, however, it suffices for any land portion 3 to include the widthwise grooves 4, and the land portions 3 defined by the tread edges TE (land portions 3a, 3d in the illustrated example) preferably include the widthwise grooves 4.

Here, the groove width (opening width (opening width measured perpendicular to the extending direction of the groove in plan view)) of the widthwise groove 4 is not particularly limited, since the groove width depends on the number of widthwise grooves 4, but can, for example, be between 1.0 mm and 1.5 mm. Similarly, the groove depth (maximum depth) of the widthwise groove 4 is not particularly limited, but can, for example, be between 4 mm and 18 mm.

In the illustrated example, all of the widthwise grooves 4 extend along the tread width direction (without inclination), but at least one of the widthwise grooves 4 may extend at an inclination relative to the tread width direction. In this case, the widthwise grooves 4 are preferably inclined relative to the tread width direction at an inclination angle of 45° or less, and are preferably inclined at an inclination angle of 30° or less. In the illustrated example, all of the widthwise grooves 4 extend straight in the tread width direction, but at least one of the widthwise grooves 4 may have a bent portion.

Here, to improve the drainage performance, the widthwise grooves 4 preferably open at the tread edge TE or a circumferential main groove 2, for example, as in the illustrated example. On the other hand, to increase the rigidity of the land portion 3, the widthwise grooves 4 can be configured not to open to either the tread edge TE or the circumferential main groove 2, so that both ends terminate in the land portion 3. Also, in the land portion 3 defined between two circumferential main grooves 2 adjacent in the tread width direction, the widthwise groove 4 may open to either of the two circumferential main grooves 2.

In the illustrated example, each land portion 3 includes a plurality of widthwise grooves 4 and no sipes. At least one of the land portions 3, however, can be configured to include sipes instead of or in addition to the widthwise grooves 4. An embodiment in which the land portion 3 includes sipes will be described below.

Figure 2:
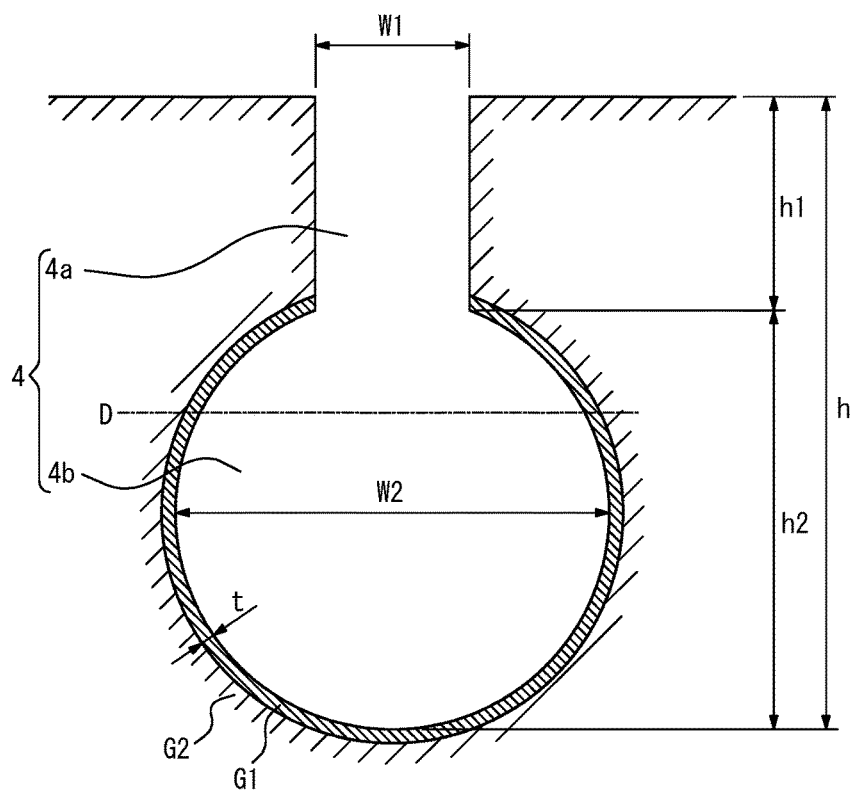
FIG. 2 is a cross-sectional view schematically illustrating an example of a widthwise groove.

FIG. 2 is a cross-sectional view schematically illustrating an example of a widthwise groove. FIG. 2 is a tread circumferential cross-sectional view of a widthwise groove extending along the tread width direction. FIG. 2 illustrates a state in which the tire is mounted on an applicable rim, filled to a prescribed internal pressure, and under no load. In the example illustrated in FIG. 2, the widthwise groove 4 includes a constant groove width portion 4a on the tread surface 1 side, in which the groove width (width measured parallel to the tread surface in a cross-sectional view) is constant (equivalent to the opening width at the tread surface 1), and a widened portion 4b on the groove bottom side, in which the groove width is larger than on the tread surface 1 side. In the illustrated example, the widened portion 4b is circular in a cross-sectional view and has a maximum width W2 at the center in the tire radial direction. The widened portion 4b can, however, have various shapes, such as an elliptical cross-sectional shape (i.e., the length in the tire radial direction may be larger or smaller than the length in the tire circumferential direction), a rectangular shape, and the like.

In the present example, the portion farther outward in the tire radial direction than the widened portion 4b is the constant groove width portion 4a that has a constant groove width, but this portion can also be a portion with a variable groove width.

The groove width W1 of the constant groove width portion 4a is not particularly limited but can, for example, be between 1.0 mm and 1.5 mm. The maximum width W2 of the widened portion 4b is not particularly limited but can, for example, be between 1.2 mm and 6.0 mm. The groove depth h of the widthwise groove is not particularly limited but can, for example, be between 4.0 mm and 18.0 mm. The groove width at the bottom of the widthwise groove 4 is preferably larger than 2.5 W1.

The extension length h1 in the depth direction of the constant groove width portion 4a is not particularly limited but can, for example, be between 2 mm and 12 mm. The extension length h2 in the depth direction of the widened portion 4b is not particularly limited but can, for example, be between 1.5 mm and 8.0 mm.

As illustrated in FIG. 2, when the tire is mounted on an applicable rim, filled to a prescribed internal pressure, and under no load, and the opening width of the widthwise groove 4 at the tread surface 1 (i.e., the width of the constant groove width portion 4a in the present example) is W1, the groove depth position, farthest outward in the tire radial direction, at which the groove width of the widened portion 4b is at least 2.5 W1 is designated as a reference depth position D.

At the aforementioned reference depth position D, the rigidity usually starts to decrease when wear progresses.

In the tire of the present embodiment, in a tire radial direction region including at least the reference depth position D, the storage modulus of first tread rubber G1 is larger than the storage modulus of second tread rubber G2 located in a region around the first tread rubber G1, the first tread rubber G1 being a groove wall surface layer defined by the widened portion 4b and covering at least part of the widened portion 4b (specifically, in the present embodiment, the storage modulus of the first tread rubber G1 is 1.5 or more times the storage modulus of the second tread rubber G2).

In the present embodiment, the tire radial direction region includes at least the region in the tire radial direction from the reference depth position D to the tire radial position at which the widened portion 4b reaches the maximum width, and in the present example, includes the entire region from the innermost edge to the outermost edge of the widened portion 4b in the tire radial direction.

In the present example, the first tread rubber G1 covers the widened portion 4b in the shape of a shell.

In the present example, the first tread rubber G1 is in the shape of a circular ring, with a discontinuous portion, in a tread circumferential cross-section. In the case in which the widened portion 4b is elliptical in a tread circumferential cross-section, the first tread rubber G1 can be an elliptical ring, with a discontinuous portion, in a tread circumferential cross-section, and in the case in which the widened portion 4b is rectangular in the tread circumferential cross-section, the first tread rubber G1 can be a rectangular ring, with a discontinuous portion, in a tread circumferential cross-section.

In the present embodiment, the thickness t of the first tread rubber G1 in a normal direction to the outline of the widened portion 4b in a tread circumferential cross-sectional view is 1.0 mm or more. In the present example, the thickness t of the first tread rubber G1 is constant. The thickness t of the first tread rubber G1 may, however, be variable. In this case, the thickness t of the first tread rubber G1 can, for example, gradually increase or decrease from the inner side to the outer side in the tire radial direction.

While it suffices for the aforementioned first tread rubber G1 to be present in at least a portion of a region in the extending direction of the widthwise groove 4 in plan view, the first tread rubber G1 is preferably present over the entire extending direction of the widthwise groove 4 in plan view.

The effects of the pneumatic tire according to the present embodiment are described below.

The pneumatic tire of the present embodiment includes a plurality of widthwise grooves 4 extending in the tread width direction in the land portion 3, and the widthwise grooves 4 include the widened portion 4b, on the groove bottom side, at which the groove width is larger than on the tread surface 1 side. As a result, the widened portion 4b with a larger groove width is exposed to the tread surface when wear progresses, thereby improving the drainage performance when wear progresses.

In the pneumatic tire of the present embodiment, in a tire radial direction region including at least the reference depth position D, the storage modulus of the first tread rubber G1 is larger than the storage modulus of the second tread rubber G2 located in a region around the first tread rubber G1, the first tread rubber G1 being a groove wall surface layer defined by the widened portion 4b and covering at least part of the widened portion 4b. This can improve the rigidity at and near the reference depth position D when wear progress, thereby suppressing local wear and uneven wear of the tire.

As described above, according to the pneumatic tire of the present embodiment, the drainage performance can be improved while the occurrence of uneven wear is suppressed when wear progresses.

Furthermore, in the present embodiment, the aforementioned tire radial direction region includes at least the region in the tire radial direction from the reference depth position D to the tire radial position at which the widened portion 4b reaches the maximum width. The drainage performance can therefore be improved while the occurrence of uneven wear is further suppressed when wear progresses. In particular, in the present example, the aforementioned tire radial direction region is the entire region from the innermost edge to the outermost edge of the widened portion 4b in the tire radial direction. The drainage performance can therefore be improved while the occurrence of uneven wear is even further suppressed when wear progresses.

Also, in the present embodiment, the thickness t of the first tread rubber G1 in a normal direction to the outline of the widened portion in a tread circumferential cross-sectional view is 1.0 mm or more. The drainage performance can therefore be improved while the occurrence of uneven wear is still further suppressed when wear progresses.

Furthermore, in the present embodiment, the storage modulus of the first tread rubber G1 is 1.5 or more times the storage modulus of the second tread rubber G2. The drainage performance can therefore be improved while the occurrence of uneven wear is particularly suppressed when wear progress.

Figure 3:
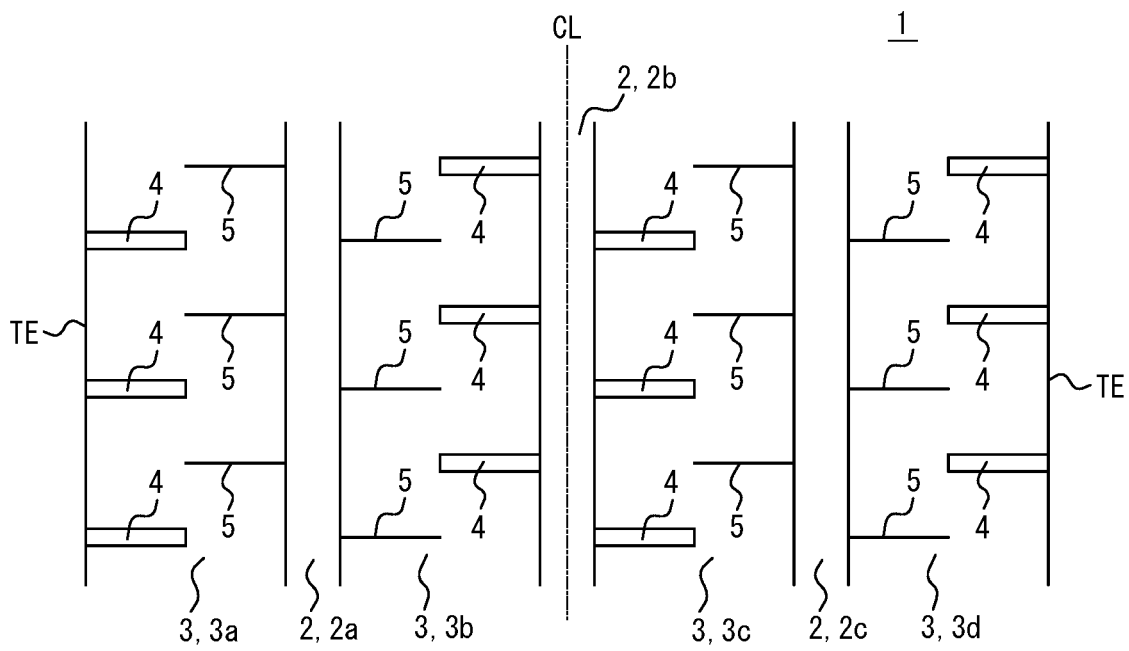
FIG. 3 is a developed view schematically illustrating a tread pattern of a pneumatic tire according to another embodiment of the present disclosure.

Next, another embodiment of the present disclosure will be described. FIG. 3 is a developed view schematically illustrating a tread pattern of a pneumatic tire according to another embodiment of the present disclosure.

The tread pattern illustrated in FIG. 3 differs from the tread pattern illustrated in FIG. 1 in that each land portion 3 further includes a plurality of widthwise sipes 5 extending in the tread width direction. Since the circumferential main grooves 2, the land portions 3, and the widthwise grooves 4 in the other embodiment illustrated in FIG. 3 are similar to those in the embodiment illustrated in FIG. 1, including the illustrated configurations and variations thereof, a detailed description is omitted, and examples of the widthwise sipes 5 are mainly described below.

In the illustrated example, each land portion 3 includes a plurality of widthwise sipes 5 extending in the tread width direction. Specifically, in the present example, the land portions 3a, 3d adjacent to a tread edge TE include widthwise sipes 5, three each in the illustrated range, that extend outward in the tread width direction from the circumferential main grooves 2a, 2c, respectively, and terminate in the land portions 3a, 3d. The land portions 3b, 3c by the center in the tread width direction also include widthwise sipes 5, three each in the illustrated range, that extend inward in the tread width direction from the circumferential main grooves 2a, 2c, respectively, and terminate in the land portions 3b, 3c. The number of the widthwise sipes 5 can be appropriately set. In the illustrated example, all of the land portions 3 include the widthwise sipes 5. When the widthwise sipes 5 are included on the tread surface 1, however, it suffices for any land portion 3 to include the widthwise sipes 5, and the land portions 3 defined by the tread edges TE (land portions 3a, 3d in the illustrated example) preferably include the widthwise sipes 5.

Here, the sipe width (opening width (opening width measured perpendicular to the extending direction of the widthwise sipe 5)) of the widthwise sipe 5 is not particularly limited, since the sipe width depends on the number of widthwise sipes 5, but can, for example, be between 0.2 mm and 1.0 mm. Similarly, the sipe depth (maximum depth) of the widthwise sipe 5 is not particularly limited, but can, for example, be between 4.0 mm and 18.0 mm.

In the illustrated example, all of the widthwise sipes 5 extend along the tread width direction (without inclination), but at least one of the widthwise sipes 5 may extend at an inclination relative to the tread width direction. In this case, the widthwise sipes 5 are preferably inclined relative to the tread width direction at an inclination angle of 45° or less, and are preferably inclined at an inclination angle of 30° or less. In the illustrated example, all of the widthwise sipes 5 extend straight in the tread width direction, but at least one of the widthwise sipes 5 may have a bent portion.

Here, to improve the drainage performance, the widthwise sipes 5 preferably open at the tread edge TE, or as in the illustrated example, a circumferential main groove 2. On the other hand, to increase the rigidity of the land portion 3, the widthwise sipes 5 can be configured not to open to either the tread edge TE or the circumferential main groove 2, so that both ends terminate in the land portion 3. Also, in the land portion 3 defined between two circumferential main grooves 2 adjacent in the tread width direction, the widthwise sipes 5 may open to either of the two circumferential main grooves 2.

Here, in the illustrated example, the widthwise grooves 4 and the widthwise sipes 5 are arranged alternately when viewed in the tread circumferential direction. This configuration can optimize the balance of rigidity of the land portion 3. On the other hand, as viewed in the tread circumferential direction, there may be a point at which two or more widthwise grooves 4 are arranged continuously between two adjacent widthwise sipes 5 in the tread circumferential direction, and there may be a point at which two or more widthwise sipes 5 are arranged continuously between two adjacent widthwise grooves 4 in the tread circumferential direction.

In the illustrated example, both the widthwise grooves 4 and the widthwise sipes 5 terminate in the center of the land portion 3 in the tread width direction. The widthwise grooves 4 and the widthwise sipes 5 may, however, have overlapping portions when projected in the tread circumferential direction, or may be arranged so as not to overlap.

Figure 4:
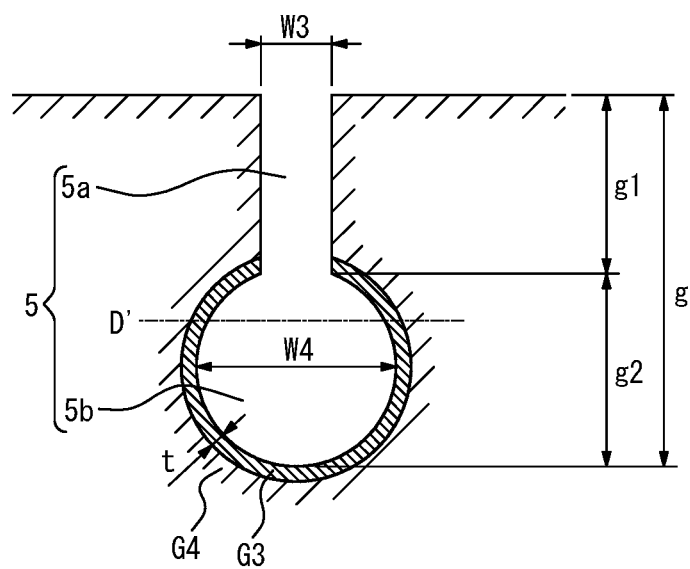
FIG. 4 is a cross-sectional view schematically illustrating an example of a widthwise sipe.

FIG. 4 is a cross-sectional view schematically illustrating an example of a widthwise sipe. FIG. 4 is a tread circumferential cross-sectional view of a widthwise sipe extending along the tread width direction. FIG. 4 illustrates a state in which the tire is mounted on an applicable rim, filled to a prescribed internal pressure, and under no load. In the example illustrated in FIG. 4, the widthwise sipe 5 includes a constant sipe width portion 5*a* on the tread surface 1 side, in which the sipe width (width measured parallel to the tread surface 1 in a cross-sectional view) is constant (equivalent to the opening width at the tread surface 1), and a widened portion 5*b* on the groove bottom side, in which the groove width is larger than on the tread surface 1 side. In the illustrated example, the widened portion 5*b* is circular in a cross-sectional view and has a maximum width W4 at the center in the tire radial direction. The widened portion 5*b* can, however, have various shapes, such as an elliptical cross-sectional shape (i.e., the length in the tire radial direction may be larger or smaller than the length in the tire circumferential direction), a rectangular shape, and the like.

In the present example, the portion farther outward in the tire radial direction than the widened portion 5*b* is the constant groove width portion 5*a* that has a constant groove width, but this portion can also be a portion with a variable groove width.

The sipe width W3 of the constant sipe width portion 5*a* is not particularly limited but can, for example, be between 0.2 mm and 1.0 mm. The maximum width W4 of the widened portion 5*b* is not particularly limited but can, for example, be between 1.2 mm and 6.0 mm. The sipe depth g of the widthwise sipe 5 is not particularly limited but can, for example, be between 4.0 mm and 18.0 mm. The sipe width at the bottom of the widthwise sipe 5 is preferably larger than 2.5 W3.

The extension length g1 in the depth direction of the constant sipe width portion 5*a* is not particularly limited but can, for example, be between 2 mm and 12 mm. The extension length g2 in the depth direction of the widened portion 5*b* is not particularly limited but can, for example, be between 1.5 mm and 8.0 mm.

As illustrated in FIG. 4, when the tire is mounted on an applicable rim, filled to a prescribed internal pressure, and under no load, and the opening width of the widthwise sipe 5 at the tread surface 1 is W3, the groove depth position, farthest outward in the tire radial direction, at which the groove width of the widened portion 5*b* is at least 2.5 W3 is designated as a reference depth position D'.

At the aforementioned reference depth position D', the rigidity usually starts to decrease when wear progresses.

From the perspective of manufacturability, the reference depth position D and the reference depth position D' are preferably at the same depth but may differ, and the reference depth position D can be larger or smaller than the reference depth position D'.

In the tire of the present embodiment, in a tire radial direction region including at least the reference depth position D', the storage modulus of first tread rubber G3 is larger than the storage modulus of second tread rubber G4 located in a region around the first tread rubber G3, the first tread rubber G3 being a groove wall surface layer defined by the widened portion 5*b* and covering at least part of the widened portion 5*b* (specifically, in the present embodiment, the storage modulus of the first tread rubber G3 is 1.5 or more times the storage modulus of the second tread rubber G4).

In the present embodiment, the aforementioned tire radial direction region includes at least the region in the tire radial direction from the reference depth position D' to the tire radial position at which the widened portion 5*b* reaches the maximum width, and in the present example, includes the entire region from the innermost edge to the outermost edge of the widened portion 5*b* in the tire radial direction.

In the present example, the first tread rubber G3 covers the widened portion 5*b* in the shape of a shell.

In the present example, the first tread rubber G3 is in the shape of a circular ring, with a discontinuous portion, in a tread circumferential cross-section. In the case in which the widened portion 5*b* is elliptical in a tread circumferential cross-section, the first tread rubber G3 can be an elliptical ring, with a discontinuous portion, in a tread circumferential cross-section, and in the case in which the widened portion 5*b* is rectangular in the tread circumferential cross-section, the first tread rubber G3 can be a rectangular ring, with a discontinuous portion, in a tread circumferential cross-section.

In the present embodiment, the thickness t of the first tread rubber G3 in a normal direction to the outline of the widened portion 5*b* in a tread circumferential cross-sectional view is 1.0 mm or more. In the present example, the thickness t of the first tread rubber G3 is constant. The thickness t of the first tread rubber G3 may, however, be variable. In this case, the thickness t of the first tread rubber G3 can, for example, gradually increase or decrease from the inner side to the outer side in the tire radial direction.

From the perspective of manufacturability, the ratio of the storage modulus of the first tread rubber G3 to the storage modulus of the second tread rubber G4 with respect to the tread rubber that defines the widthwise sipes 5 is preferably the same as the ratio of the storage modulus of the first tread rubber to the storage modulus of the second tread rubber G2 with respect to the tread rubber that defines the widthwise grooves 4, but these ratios may differ, and either may be larger or smaller.

While it suffices for the aforementioned first tread rubber G3 to be present in at least a portion of a region in the extending direction of the widthwise sipe 5 in plan view, the first tread rubber G3 is preferably present over the entire extending direction of the widthwise sipe 5 in plan view.

The effects of the pneumatic tire according to the other embodiment illustrated in FIGS. 3 and 4 are described below.

First, according to the pneumatic tire of the other embodiment illustrated in FIGS. 3 and 4, the same effects as in the embodiment illustrated in FIG. 1 can be obtained for the circumferential main grooves 2, the rib-like land portions 3, and the widthwise grooves 4.

Additionally, the pneumatic tire of the present embodiment includes a plurality of widthwise sipes 5 extending in the tread width direction in the land portion 3, and the widthwise sipes 5 include the widened portion 5*b*, on the sipe bottom side, at which the sipe width is larger than on the tread surface 1 side. As a result, the widened portion 5*b* with a large sipe width is exposed to the tread surface when wear progresses, thereby improving the drainage performance when wear progresses.

In the pneumatic tire of the embodiment illustrated in FIGS. 3 and 4, in a tire radial direction region including at least the reference depth position D', the storage modulus of the first tread rubber G3 is larger than the storage modulus of the second tread rubber G4 located in a region around the first tread rubber G3, the first tread rubber G3 being a groove wall surface layer defined by the widened portion 5*b* and covering at least part of the widened portion 5*b*. This can improve the rigidity at and near the reference depth position D' when wear progress, thereby suppressing local wear and uneven wear of the tire.

As described above, according to the pneumatic tire of the other embodiment illustrated in FIGS. 3 and 4, the drainage performance can be further improved while the occurrence of uneven wear is further suppressed when wear progresses.

Furthermore, in the present embodiment, the aforementioned tire radial direction region includes at least the region in the tire radial direction from the reference depth position D' to the tire radial position at which the widened portion 5*b* reaches the maximum width. The drainage performance can therefore be improved while the occurrence of uneven wear is further suppressed when wear progresses. In particular, in the present example, the aforementioned tire radial direction region is the entire region from the innermost edge to the outermost edge of the widened portion 5*b* in the tire radial direction. The drainage performance can therefore be improved while the occurrence of uneven wear is even further suppressed when wear progresses.

Also, in the present embodiment, the thickness t of the first tread rubber G3 in a normal direction to the outline of the widened portion in a tread circumferential cross-sectional view is 1.0 mm or more. The drainage performance can therefore be improved while the occurrence of uneven wear is still further suppressed when wear progresses.

Furthermore, in the present embodiment, the storage modulus of the first tread rubber G3 is 1.5 or more times the storage modulus of the second tread rubber G4. The drainage performance can therefore be improved while the occurrence of uneven wear is particularly suppressed when wear progress.

Figure 5:
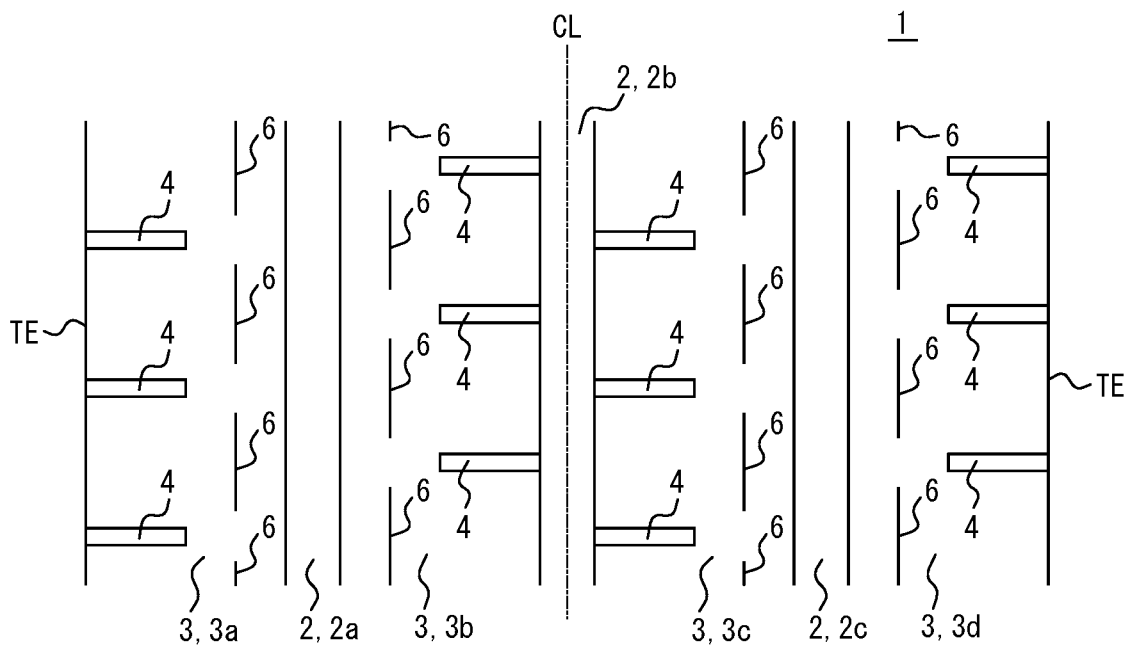
FIG. 5 is a developed view schematically illustrating a tread pattern of a pneumatic tire according to yet another embodiment of the present disclosure.

Next, yet another embodiment of the present disclosure will be described. FIG. 5 is a developed view schematically illustrating a tread pattern of a pneumatic tire according to yet another embodiment of the present disclosure.

The tread pattern illustrated in FIG. 5 differs from the tread pattern illustrated in FIG. 1 in that each land portion 3 further includes a plurality of circumferential sipes 6 extending in the tread circumferential direction. Since the circumferential main grooves 2, the land portions 3, and the widthwise grooves 4 in yet another embodiment illustrated in FIG. 5 are similar to those in the embodiment illustrated in FIG. 1, including the illustrated configurations and variations thereof, a detailed description is omitted, and examples of the circumferential sipes 6 are mainly described below.

In the illustrated example, each land portion 3 includes a plurality of circumferential sipes 6 extending in the tread circumferential direction. Specifically, in the present example, each rib-like land portion 3 adjacent to a tread edge TE includes circumferential sipes 6, four each in the illustrated range, that extend in the tread circumferential direction, with both ends terminating in the land portion 3. The number of the circumferential sipes 6 can be appropriately set. In the present example, both ends of the circumferential sipes 6 terminate within the rib-like land portion 3, but the circumferential sipes 6 may be configured as one circumferential sipe 6 that extends continuously in the tread circumferential direction. In the illustrated example, all of the land portions 3 include the circumferential sipes 6. When the circumferential sipes 6 are included on the tread surface 1, however, it suffices for any land portion 3 to include the circumferential sipes 6, and the land portions 3 defined by the tread edges TE (land portions 3*a*, 3*d* in the illustrated example) preferably include the circumferential sipes 6.

Here, the sipe width (opening width (opening width measured perpendicular to the extending direction of the circumferential sipe 6)) of the circumferential sipe 6 is not particularly limited, since the sipe width depends on the number of circumferential sipes 6, but can, for example, be between 0.2 mm and 1.5 mm. Similarly, the sipe depth (maximum depth) of the circumferential sipe 6 is not particularly limited, but can, for example, be between 4.0 mm and 18.0 mm.

In the illustrated example, all of the circumferential sipes 6 extend along the tread circumferential direction (without inclination), but at least one of the circumferential sipes 6 may extend at an inclination relative to the tread circumferential direction. In this case, the circumferential sipes 6 are preferably inclined relative to the tread circumferential direction at an inclination angle of 25° or less, and are preferably inclined at an inclination angle of 10° or less. In the illustrated example, all of the circumferential sipes 6 extend straight in the tread circumferential direction, but at least one of the circumferential sipes 6 may have a bent portion.

In the illustrated example, the widthwise grooves 4 and the circumferential sipes 6 are arranged in each land portion 3 so as not to overlap when projected in the tread width direction but may be arranged to partially overlap.

Figure 6:
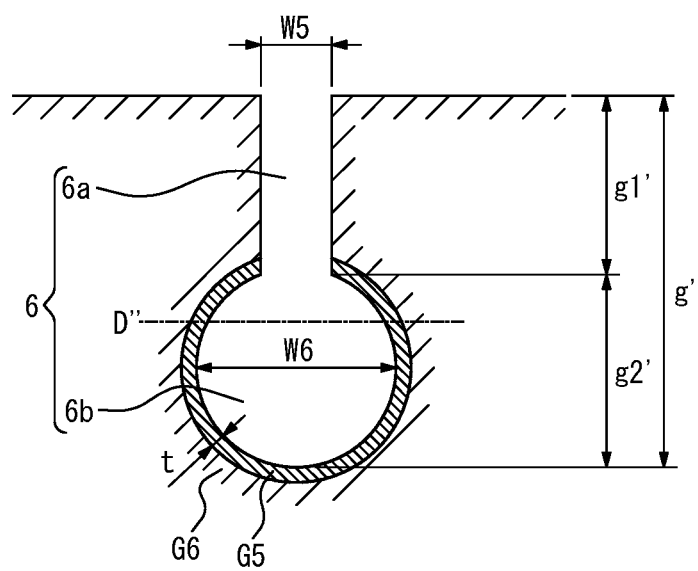
FIG. 6 is a cross-sectional view schematically illustrating an example of a circumferential sipe.

FIG. 6 is a cross-sectional view schematically illustrating an example of a circumferential sipe. FIG. 6 is a tread widthwise cross-sectional view of a circumferential sipe extending along the tread circumferential direction. FIG. 6 illustrates a state in which the tire is mounted on an applicable rim, filled to a prescribed internal pressure, and under no load. In the example illustrated in FIG. 6, the circumferential sipe 6 includes a constant sipe width portion 6*a* on the tread surface 1 side, in which the sipe width (width measured parallel to the tread surface 1 in a cross-sectional view) is constant (equivalent to the opening width at the tread surface 1), and a widened portion 6b on the groove bottom side, in which the sipe width is larger than on the tread surface 1 side. In the illustrated example, the widened portion 6b is circular in a cross-sectional view and has a maximum width W6 at the center in the tire radial direction. The widened portion 6b can, however, have various shapes, such as an elliptical cross-sectional shape (i.e., the length in the tire radial direction may be larger or smaller than the length in the tire width direction), a rectangular shape, and the like.

In the present example, the portion farther outward in the tire radial direction than the widened portion 6b is the constant groove width portion 6a that has a constant groove width, but this portion can also be a portion with a variable groove width.

The width W5 of the constant sipe width portion 6a is not particularly limited but can, for example, be between 0.2 mm and 1.5 mm. The maximum width W6 of the widened portion 6b is not particularly limited but can, for example, be between 1.2 mm and 6.0 mm. The depth g' of the circumferential sipe 6 is not particularly limited but can, for example, be between 4.0 mm and 18.0 mm. The sipe width at the bottom of the circumferential sipe 6 is preferably larger than 2.5 W5.

The extension length g1' in the depth direction of the constant sipe width portion 6a is not particularly limited but can, for example, be between 2.0 mm and 12 mm. The extension length g2' in the depth direction of the widened portion 6b is not particularly limited but can, for example, be between 1.5 mm and 8.0 mm.

As illustrated in FIG. 6, when the tire is mounted on an applicable rim, filled to a prescribed internal pressure, and under no load, and the opening width of the circumferential sipe 6 at the tread surface 1 is W5, the groove depth position, farthest outward in the tire radial direction, at which the groove width of the widened portion 6b is at least 2.5 W5 is designated as a reference depth position D".

At the aforementioned reference depth position D", the rigidity usually starts to decrease when wear progresses.

From the perspective of manufacturability, the reference depth position D and the reference depth position D" are preferably at the same depth but may differ, and the reference depth position D can be larger or smaller than the reference depth position D".

In the tire of the present embodiment, in a tire radial direction region including at least the reference depth position D", the storage modulus of first tread rubber G5 is larger than the storage modulus of second tread rubber G6 located in a region around the first tread rubber G5, the first tread rubber G5 being a groove wall surface layer defined by the widened portion 6b and covering at least part of the widened portion 6b (specifically, in the present embodiment, the storage modulus of the first tread rubber G5 is 1.5 or more times the storage modulus of the second tread rubber G6).

In the present embodiment, the aforementioned tire radial direction region includes at least the region in the tire radial direction from the reference depth position D" to the tire radial position at which the widened portion 6b reaches the maximum width, and in the present example, includes the entire region from the innermost edge to the outermost edge of the widened portion 6b in the tire radial direction.

In the present example, the first tread rubber G5 covers the widened portion 5b in the shape of a shell.

In the present example, the first tread rubber G5 is in the shape of a circular ring, with a discontinuous portion, in a tread widthwise cross-section. In the case in which the widened portion 6b is elliptical in a tread widthwise cross-section, the first tread rubber G5 can be an elliptical ring, with a discontinuous portion, in a tread widthwise cross-section, and in the case in which the widened portion 6b is rectangular in the tread widthwise cross-section, the first tread rubber G5 can be a rectangular ring, with a discontinuous portion, in a tread widthwise cross-section.

In the present embodiment, the thickness t of the first tread rubber G5 in a normal direction to the outline of the widened portion 6b in a tread widthwise cross-sectional view is 1.0 mm or more. In the present example, the thickness t of the first tread rubber G5 is constant. The thickness t of the first tread rubber G5 may, however, be variable. In this case, the thickness t of the first tread rubber G5 can, for example, gradually increase or decrease from the inner side to the outer side in the tire radial direction.

From the perspective of manufacturability, the ratio of the storage modulus of the first tread rubber G5 to the storage modulus of the second tread rubber G6 with respect to the tread rubber that defines the circumferential sipes 6 is preferably the same as the ratio of the storage modulus of the first tread rubber G1 to the storage modulus of the second tread rubber G2 with respect to the tread rubber that defines the widthwise grooves 4, but these ratios may differ, and either may be larger or smaller.

While it suffices for the aforementioned first tread rubber G5 to be present in at least a portion of a region in the extending direction of the circumferential sipe 6 in plan view, the first tread rubber G5 is preferably present over the entire extending direction of the circumferential sipe 6 in plan view.

The effects of the pneumatic tire according to yet another embodiment illustrated in FIGS. 5 and 6 are described below.

First, according to the pneumatic tire of yet another embodiment illustrated in FIGS. 5 and 6, the same effects as in the embodiment illustrated in FIG. 1 can be obtained for the circumferential main groove 2, the rib-like land portions 3, and the widthwise grooves 4.

Additionally, the pneumatic tire of the present embodiment illustrated in FIGS. 5 and 6 includes at least one circumferential sipe 6 extending in the tread circumferential direction in the land portion 3, and the circumferential sipe 6 includes the widened portion 5b, on the sipe bottom side, at which the sipe width is larger than on the tread surface 1 side. As a result, the widened portion 6b with a larger sipe width is exposed to the tread surface when wear progresses, thereby improving the drainage performance when wear progresses.

In the pneumatic tire of the embodiment illustrated in FIGS. 5 and 6, in a tire radial direction region including at least the reference depth position D", the storage modulus of the first tread rubber G5 is larger than the storage modulus of the second tread rubber G6 located in a region around the first tread rubber G5, the first tread rubber G5 being a groove wall surface layer defined by the widened portion 6b and covering at least part of the widened portion 6b. This can improve the rigidity at and near the reference depth position D" when wear progress, thereby suppressing local wear and uneven wear of the tire.

As described above, according to the pneumatic tire of the other embodiment illustrated in FIGS. 5 and 6, the drainage performance can be further improved while the occurrence of uneven wear is further suppressed when wear progresses.

Furthermore, in the present embodiment, the aforementioned tire radial direction region includes at least the region in the tire radial direction from the reference depth position D" to the tire radial position at which the widened portion 6b reaches the maximum width. The drainage performance can therefore be improved while the occurrence of uneven wear is further suppressed when wear progresses. In particular, in the present example, the aforementioned tire radial direction region is the entire region from the innermost edge to the outermost edge of the widened portion 6b in the tire radial direction. The drainage performance can therefore be improved while the occurrence of uneven wear is even further suppressed when wear progresses.

Also, in the present embodiment, the thickness t of the first tread rubber G5 in a normal direction to the outline of the widened portion in a tread widthwise cross-sectional view is 1.0 mm or more. The drainage performance can therefore be improved while the occurrence of uneven wear is still further suppressed when wear progresses.

Furthermore, in the present embodiment, the storage modulus of the first tread rubber G5 is 1.5 or more times the storage modulus of the second tread rubber G6. The drainage performance can therefore be improved while the occurrence of uneven wear is particularly suppressed when wear progress.

In each of the above examples, the tire radial direction region preferably includes at least a region in the tire radial direction from the reference depth position to a tire radial position at which the widened portion reaches the maximum width. This is because the drainage performance can be improved while the occurrence of uneven wear is further suppressed when wear progresses. The tire radial direction region more preferably includes the entire region from the innermost edge to the outermost edge of the widened portion in the tire radial direction. This is because the drainage performance can be improved while the occurrence of uneven wear is even further suppressed when wear progresses.

In each of the above examples, the thickness t of the first tread rubber in the normal direction to the outline of the widened portion in the cross-sectional view (in the examples of FIGS. 1 to 4, in a tread circumferential cross-sectional view, and in the examples of FIGS. 5 and 6, in a tread widthwise cross-sectional view) is preferably 1.0 mm or more. This is because by adoption of the above range, the drainage performance can be improved while the occurrence of uneven wear is even further suppressed when wear progresses. For the same reason, the thickness t is more preferably 1.5 mm or more. On the other hand, the thickness t is preferably 2.0 mm or less to prevent a decrease in ride comfort due to an excessively high rigidity of the land portion.

The storage modulus of the first tread rubber is preferably 1.5 or more times the storage modulus of the second tread rubber. This is because the drainage performance can be improved while the occurrence of uneven wear is particularly suppressed when wear progresses. For the same reason, the storage modulus of the first tread rubber is more preferably 1.8 or more times the storage modulus of the second tread rubber. On the other hand, to prevent the step in rigidity from becoming too large, the storage modulus of the first tread rubber is preferably 3.5 or less times the storage modulus of the second tread rubber.

At least the land portions defined by the tread edges preferably include the widthwise grooves having a widened portion (which uses the first tread rubber with the aforementioned relatively higher storage modulus than that of the second tread rubber). This is because, particularly at least in the land portions defined by the tread edges, the drainage performance can be improved while the occurrence of uneven wear is suppressed when wear progresses.

At least the land portions defined by the tread edges preferably include the widthwise sipes having a widened portion (which uses the first tread rubber with the aforementioned relatively higher storage modulus than that of the second tread rubber). This is because, particularly at least in the land portions defined by the tread edges, the drainage performance can be improved while the occurrence of uneven wear is suppressed when wear progresses.

At least the land portions defined by the tread edges preferably include the circumferential sipes having a widened portion (which uses the first tread rubber with the aforementioned relatively higher storage modulus than that of the second tread rubber). This is because, particularly at least in the land portions defined by the tread edges, the drainage performance can be improved while the occurrence of uneven wear is suppressed when wear progresses.

These configurations are particularly suitable for tires in which the amount of wear in the land portions defined by the tread edges is relatively high.

The aforementioned widthwise grooves can, for example, be manufactured using a mold having a corresponding shape. The aforementioned widthwise sipes and circumferential sipes can, for example, be manufactured using a blade having a corresponding shape. To cover part of the widened portion with the tread rubber that has a high storage modulus, only the surface of the unvulcanized tire can be covered with the tread rubber that has a high storage modulus, for example, and the tread rubber can be draw inward in the tire depth direction when the corresponding mold shape penetrates the tread rubber during vulcanization.

While embodiments of the present disclosure have been described above, the present disclosure is in no way limited to the above embodiments. For example, in the other embodiment illustrated in FIGS. 3 and 4, the widthwise groove 4 has the shape illustrated in FIG. 2, and the widthwise sipe 5 has the shape illustrated in FIG. 4, but the widthwise groove 4 may be a groove with U-shaped cross-section or a V-shaped cross-section, for example, and the widthwise sipe 5 may have the shape illustrated in FIG. 4. Similarly, in yet another embodiment illustrated in FIGS. 5 and 6, the widthwise groove 4 has the shape illustrated in FIG. 2, and the circumferential sipe 6 has the shape illustrated in FIG. 6, but the widthwise groove 4 may be a groove with U-shaped cross-section or a V-shaped cross-section, for example, and the circumferential sipe 6 may have the shape illustrated in FIG. 6.

For example, although all of the land portions include the widthwise grooves in the embodiments illustrated in FIGS. 1 to 6, a configuration may be adopted in which the widthwise grooves are not included, and any of the land portions includes only the widthwise sipes and/or the circumferential sipes. In this case, the arrangement, sipe width, sipe depth, shape, and the like of the widthwise sipes and/or circumferential sipes can be similar to the configurations described in the embodiments illustrated in FIGS. 3 to 6. In other words, a configuration can be adopted in which the land portion includes a plurality of widthwise sipes extending in the tread width direction, the widthwise sipe includes a widened portion, on a sipe bottom side, at which a sipe width is larger than on the tread surface side, and in a tire radial direction region including at least the reference depth position, a storage modulus of first tread rubber is larger than a storage modulus of second tread rubber located in a region around the first tread rubber, the first tread rubber being a groove wall surface layer defined by the widened portion and covering at least part of the widened portion, and/or the land portion includes at least one circumferential sipe extending in the tread circumferential direction, the circumferential sipe includes a widened portion, on a sipe bottom side, at which a sipe width is larger than on the tread surface side, and in a tire radial direction region including at least the reference depth position, a storage modulus of first tread rubber is larger than a storage modulus of second tread rubber located in a region around the first tread rubber, the first tread rubber being a groove wall surface layer defined by the widened portion and covering at least part of the widened portion.

Furthermore, unlike the configuration illustrated in FIGS. 1 to 6, a configuration can be adopted in which widthwise grooves are included or omitted, and both the widthwise sipes and the circumferential sipes are included. In this case, the widthwise sipes and the circumferential sipes may or may not intersect each other. Furthermore, a configuration can be adopted in which the widthwise sipes and/or the circumferential sipes include a widened portion, on a sipe bottom side, at which a sipe width is larger than on the tread surface side, and in a tire radial direction region including at least the reference depth position, a storage modulus of first tread rubber is larger than a storage modulus of second tread rubber located in a region around the first tread rubber, the first tread rubber being a groove wall surface layer defined by the widened portion and covering at least part of the widened portion.

As described above, it suffices for the widthwise groove, the widthwise sipe, and/or the circumferential sipe to be included on the tread surface. Furthermore, it suffices to adopt a configuration in which the widthwise grooves, the widthwise sipes, and/or the circumferential sipes include a widened portion, on a groove bottom side (sipe bottom side), at which a groove width (sipe width) is larger than on the tread surface side, and in a tire radial direction region including at least the reference depth position, a storage modulus of first tread rubber is larger than a storage modulus of second tread rubber located in a region around the first tread rubber, the first tread rubber being a groove wall surface layer defined by the widened portion and covering at least part of the widened portion.

From the perspective of manufacturability, the reference depth position D, the reference depth position D', and the reference depth position D" preferably have the same depth. These depths may differ, however, in which case any of the reference depth position D, the reference depth position D', and the reference depth position D" may be deeper or shallower than any other.

From the perspective of manufacturability, the ratio of the storage modulus of the first tread rubber to the storage modulus of the second tread rubber is preferably the same with respect to the tread rubber that defines the widthwise grooves, the widthwise sipes, and the circumferential sipes, but the ratios may differ among these tread rubbers, and any ratio may be larger or smaller than any other ratio.

When the widthwise grooves, the widthwise sipes, and the circumferential sipes have corners, a rounded portion may be formed by chamfering or the like at any one or more of the corners.

The pneumatic tire of the present disclosure is particularly suitable for use as a passenger vehicle tire or a heavy-duty tire (especially a truck/bus tire).

REFERENCE SIGNS LIST

1 Tread surface
2 Circumferential main groove
3 Land portion
4 Widthwise groove
4a Constant groove width portion
4b Widened portion
4b1 First widened portion
4b2 Second widened portion
5 Widthwise sipe
5a Constant sipe width portion
5b Widened portion
6 Circumferential sipe
6a Constant sipe width portion
6b Widened portion
G1, G3, G5 First tread rubber
G2, G4, G6 Second tread rubber
CL Tire equatorial plane
TE Tread edge

The invention claimed is:

1. A pneumatic tire comprising: on a tread surface, a plurality of circumferential main grooves extending in a tread circumferential direction, and a plurality of land portions, each land portion being defined between circumferential main grooves adjacent in a tread width direction among the plurality of circumferential main grooves, or by a circumferential main groove among the plurality of circumferential main grooves and a tread edge, wherein
   at least one land portion of the plurality of land portions includes a plurality of widthwise grooves extending in the tread width direction,
   at least one widthwise groove of the plurality of widthwise grooves includes a widened portion, on a groove bottom side, at which a groove width is larger than on the tread surface side,
   when the pneumatic tire is mounted on an applicable rim, filled to a prescribed internal pressure, and under no load, a groove depth position of the widened portion that is farthest outward in a tire radial direction, at which the groove width of the widened portion of the at least one widthwise groove is 2.5 or more times an opening width of the at least one widthwise groove at the tread surface, is designated as a reference depth position,
   in a tire radial direction region including at least the reference depth position, a storage modulus of first tread rubber is larger than a storage modulus of second tread rubber located in a region around the first tread rubber, the first tread rubber being a groove wall surface layer defined by the widened portion, and
   the first tread rubber is formed only on a groove wall surface of an entire portion of the widened portion and not on an entire groove wall surface of the at least one widthwise groove.

2. The pneumatic tire of claim 1, wherein
   a width at the reference depth position is not a maximum width, and
   the tire radial direction region includes at least a region in the tire radial direction from the reference depth position to a tire radial position at which the widened portion reaches the maximum width.

3. The pneumatic tire of claim 2, wherein the tire radial direction region is an entire region from an innermost edge to an outermost edge of the widened portion in the tire radial direction.

4. The pneumatic tire of claim 1, wherein the tire radial direction region is an entire region from an innermost edge to an outermost edge of the widened portion in the tire radial direction.

5. The pneumatic tire of claim 1, wherein a thickness of the first tread rubber in a normal direction to an outline of the widened portion of the at least one widthwise groove in a tread circumferential cross-sectional view is 1.0 mm or more.

6. The pneumatic tire of claim 1, wherein the storage modulus of the first tread rubber is 1.5 or more times the storage modulus of the second tread rubber.

7. The pneumatic tire of claim 1, wherein the storage modulus of the first tread rubber is 1.8 or more times the storage modulus of the second tread rubber.

8. The pneumatic tire of claim 1, wherein at least the land portion defined by the tread edge includes the at least one widthwise groove that includes the widened portion.

9. A pneumatic tire comprising: on a tread surface, a plurality of circumferential main grooves extending in a tread circumferential direction, and a plurality of land portions, each land portion being defined between circumferential main grooves adjacent in a tread width direction among the plurality of circumferential main grooves, or by a circumferential main groove among the plurality of circumferential main grooves and a tread edge, wherein
at least one land portion of the plurality of land portions includes a plurality of widthwise sipes extending in the tread width direction,
at least one widthwise sipe of the plurality of widthwise sipes includes a widened portion, on a sipe bottom side, at which a sipe width is larger than on the tread surface side,
when the pneumatic tire is mounted on an applicable rim, filled to a prescribed internal pressure, and under no load, a sipe depth of the widened portion that is farthest outward in a tire radial direction, at which the sipe width of the widened portion of the at least one widthwise sipe is 2.5 or more times an opening width of the at least one widthwise sipe at the tread surface, is designated as a reference depth position,
in a tire radial direction region including at least the reference depth position, a storage modulus of first tread rubber is larger than a storage modulus of second tread rubber located in a region around the first tread rubber, the first tread rubber being a groove wall surface layer defined by the widened portion, and
the first tread rubber is formed only on a groove wall surface of an entire portion of the widened portion and not on an entire groove wall surface of the at least one widthwise sipe.

10. The pneumatic tire of claim 9, wherein a thickness of the first tread rubber in a normal direction to an outline of the widened portion of the at least one widthwise sipe in a tread circumferential cross-sectional view is 1.0 mm or more.

11. The pneumatic tire of claim 9, wherein at least the land portion defined by the tread edge includes the at least one widthwise sipe that includes the widened portion.

12. The pneumatic tire of claim 9, wherein
a width at the reference depth position is not a maximum width, and
the tire radial direction region includes at least a region in the tire radial direction from the reference depth position to a tire radial position at which the widened portion reaches the maximum width.

13. The pneumatic tire of claim 9, wherein the tire radial direction region is an entire region from an innermost edge to an outermost edge of the widened portion in the tire radial direction.

14. The pneumatic tire of claim 9, wherein the storage modulus of the first tread rubber is 1.5 or more times the storage modulus of the second tread rubber.

15. A pneumatic tire comprising: on a tread surface, a plurality of circumferential main grooves extending in a tread circumferential direction, and a plurality of land portions, each land portion being defined between circumferential main grooves adjacent in a tread width direction among the plurality of circumferential main grooves, or by a circumferential main groove among the plurality of circumferential main grooves and a tread edge, wherein
at least one land portion of the plurality of land portions includes a plurality of circumferential sipes extending in the tread circumferential direction,
at least one circumferential sipe of the plurality of circumferential sipes includes a widened portion, on a sipe bottom side, at which a sipe width is larger than on the tread surface side,
when the pneumatic tire is mounted on an applicable rim, filled to a prescribed internal pressure, and under no load, a sipe depth of the widened portion that is farthest outward in a tire radial direction, at which the sipe width of the widened portion of the at least one circumferential sipe is 2.5 or more times an opening width of the at least one circumferential sipe at the tread surface, is designated as a reference depth position,
in a tire radial direction region including at least the reference depth position, a storage modulus of first tread rubber is larger than a storage modulus of second tread rubber located in a region around the first tread rubber, the first tread rubber being a groove wall surface layer defined by the widened portion, and
the first tread rubber is formed only on a groove wall surface of an entire portion of the widened portion and not on an entire groove wall surface of the at least one circumferential sipe.

16. The pneumatic tire of claim 15, wherein a thickness of the first tread rubber in a normal direction to an outline of the widened portion of the at least one circumferential sipe in a tread widthwise cross-sectional view is 1.0 mm or more.

17. The pneumatic tire of claim 15, wherein at least the land portion defined by the tread edge includes the at least one circumferential sipe that includes the widened portion.

18. The pneumatic tire of claim 15, wherein
a width at the reference depth position is not a maximum width, and
the tire radial direction region includes at least a region in the tire radial direction from the reference depth position to a tire radial position at which the widened portion reaches the maximum width.

19. The pneumatic tire of claim 15, wherein the tire radial direction region is an entire region from an innermost edge to an outermost edge of the widened portion in the tire radial direction.

20. The pneumatic tire of claim 15, wherein the storage modulus of the first tread rubber is 1.5 or more times the storage modulus of the second tread rubber.

* * * * *